No. 724,352. PATENTED MAR. 31, 1903.
C. T. SYLVESTER.
COMBINED LISTER OR BREAKING PLOW AND SEED PLANTER.
APPLICATION FILED JULY 24, 1902.
NO MODEL. 2 SHEETS—SHEET 1.

Witnesses.
Inventor.
Carrol T. Sylvester,
By James L. Norris,
Atty.

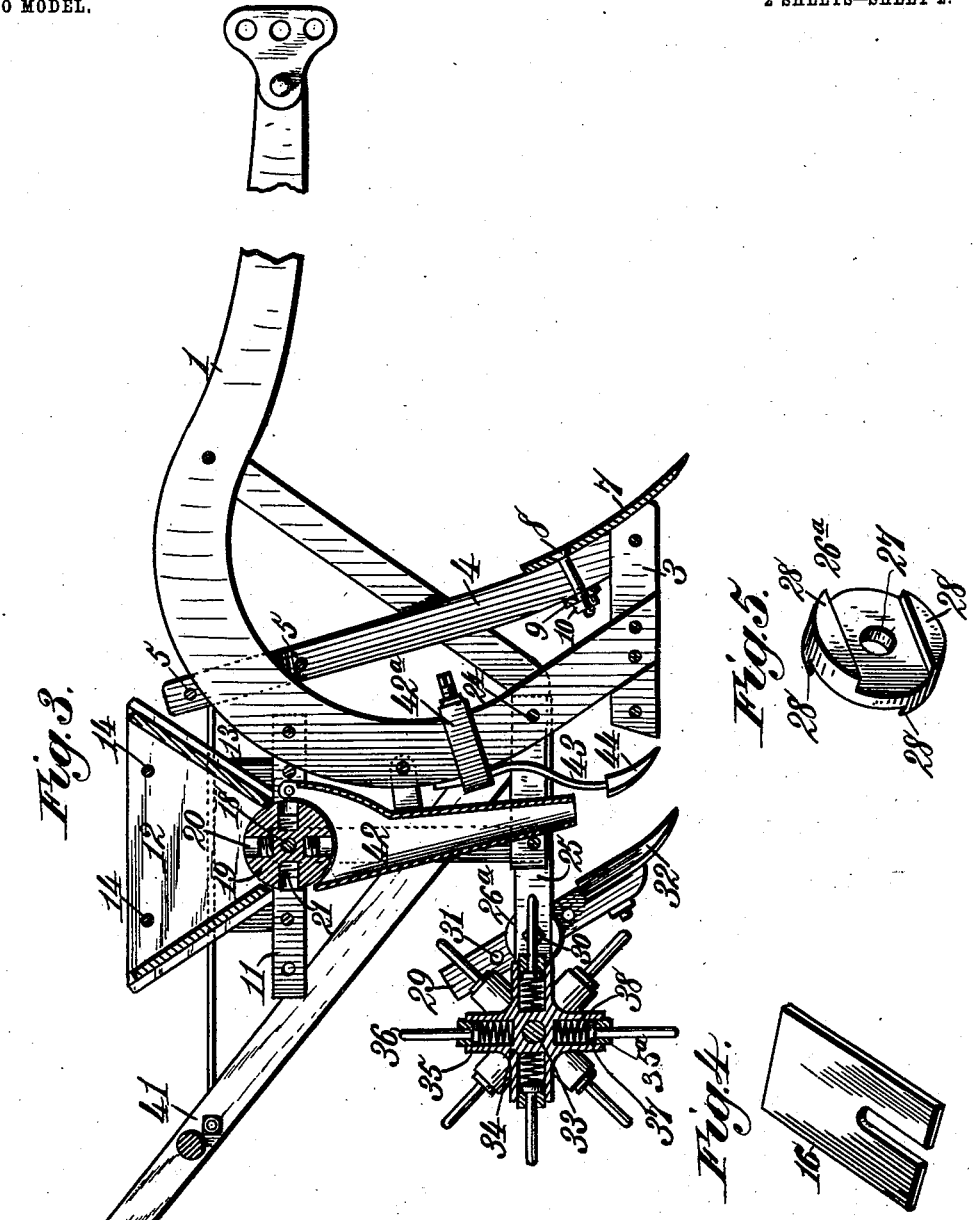

UNITED STATES PATENT OFFICE.

CARROL T. SYLVESTER, OF CHILTON, TEXAS.

COMBINED LISTER OR BREAKING PLOW AND SEED-PLANTER.

SPECIFICATION forming part of Letters Patent No. 724,352, dated March 31, 1903.

Application filed July 24, 1902. Serial No. 116,848. (No model.)

*To all whom it may concern:*

Be it known that I, CARROL T. SYLVESTER, a citizen of the United States, residing at Chilton, in the county of Falls and State of Texas, have invented new and useful Improvements in a Combined Lister or Breaking Plow and Seed-Planter, of which the following is a specification.

This invention relates to seed-planters; and it has for its object to provide improved means for actuating the seed-dropping mechanism.

It also has for its object to provide improved means for attaching the covering-plows to their supports.

It has for a further object to improve the construction of the plow-frame.

To these ends my invention consists in the features and in the construction, combination, and arrangement of parts hereinafter described, and particularly pointed out in the claims following the description, reference being had to the accompanying drawings, forming a part of the specification, in which—

Figure 1:
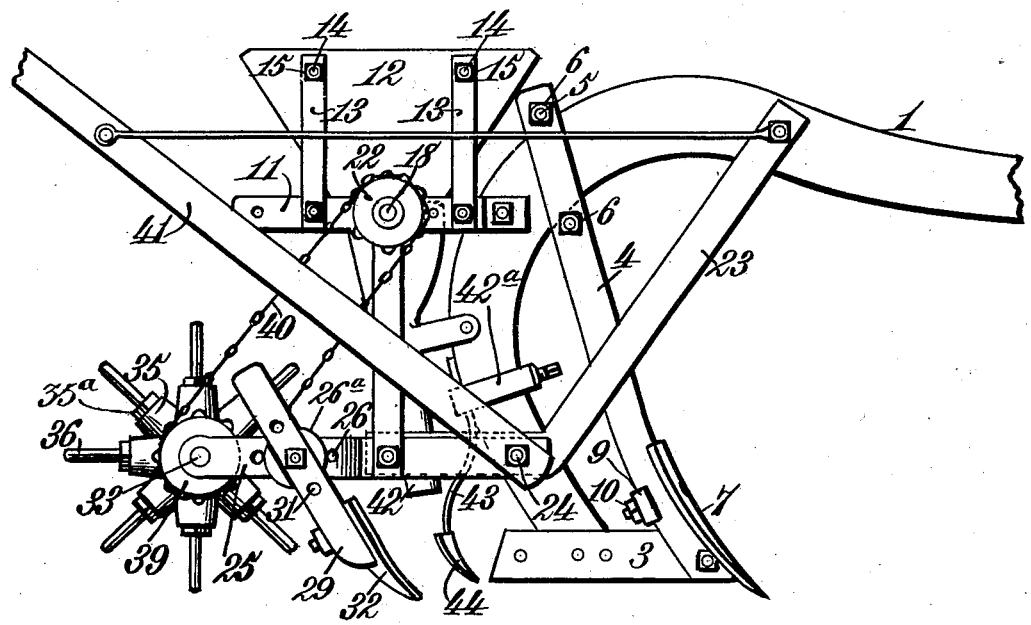
Figure 2:
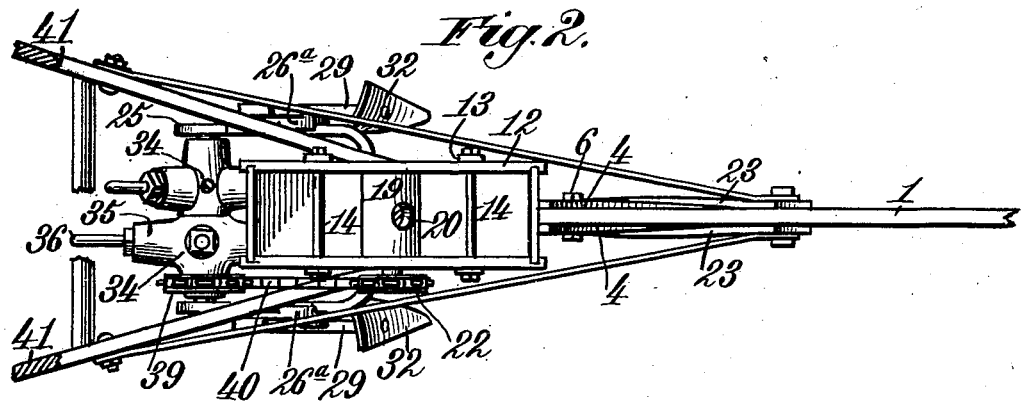

Figure 1 is a side elevation of my improved planter. Fig. 2 is a top plan view. Fig. 3 is a longitudinal sectional view. Fig. 4 is a detail perspective view of the partition that closes the front end of the hopper, and Fig. 5 is a similar view of one of the disks employed for securing the covering-plow standards to their supports.

Referring to the drawings, the numeral 1 indicates the plow-beam, which at its rear end is bent downwardly and forwardly and has bolted to the opposite sides of its lower end two metallic bars 3, which constitute the plow-foot. Bolted to the opposite sides of the forward end of the foot 3 are two metallic bars 4, which are inclined slightly rearward and embrace the beam 1, said bars at their upper ends being clamped over the beam by bolts 5 and nuts 6. The said bars constitute the plow-standard, and to said standard is adjustably secured a shovel 7. The shovel is secured to the standard by means of a headed bolt 8, which passes through the shovel and between the two bars forming the standard and through a clip 9, that embraces the rear edges of said bars, a nut 10 being screwed over the rear nut of the bolt and bearing against the clip. Bolted to the rear curved portion of the beam are two horizontally and rearwardly extending bracket-arms 11, on which is seated a seed-hopper 12, which is secured in place by metallic straps 13, that are bolted at their lower ends to said arms and extend up alongside the opposite sides of said hopper and are secured at their upper ends to the hopper by rods 14, which extend through said straps and through the sides of the hopper and have screwed on their outer ends nuts 15. The bottom of the hopper is open, and removably arranged in the front end of said hopper is a slotted partition 16. Journaled in the horizontal arms 11 is a shaft 18, on which is fixed a feed-roll 19, that is disposed in the open bottom of the hopper and is arranged to rotate in the latter. Formed circumferentially in the roller are seed-cups 20, in the bottoms of which are fitted screws 21. By screwing said screws in or out of the bottoms of said cups the capacity of the latter may be varied to suit the seed that is to be planted. On one end of the shaft 18 is fixed a sprocket-wheel 22, for the purpose hereinafter described.

Bolted to the opposite sides of the horizontal portion of the beam 1 are two metallic straps 23, which extend down to the rearwardly-curved portion of said beam and are bolted to the latter by a bolt 24. These straps operate as braces to strengthen the plow-beam. Secured to the opposite sides of the rear downwardly-extending portion of the beam by the bolt 24 are two horizontally rearwardly extending and divergent arms 25, each of which is provided with a plurality of bolt-holes 26. Adapted to be secured to the arms 25 are disks 26ª, each of said disks being centrally perforated, as at 27, and having formed on each of its opposite faces parallel lugs 28, the lugs on one side of the disk being arranged at an angle to the lugs on the other side thereof. The lugs 28 on one side of the disks are arranged to embrace the upper and lower edges of the arms 25, and the lugs on the other side of the disks embrace the forward and rear edges of the plow-standards 29, the disks being held to their seats on the arms 25 and the plow-standards being held to their seats between the lugs on the outer sides of said disks by bolts 30, which pass through the plow-standards 29, the disks 26, and the arms 25. By shifting the bolts 30 from one to another of the perforations 26 in the arms 25 the plow-standards 29 may be adjusted forward and backward, and by providing a plurality of bolt-holes 31 in said plow-standards the bolts 30 may be passed through either of said bolt-holes, and thereby permit of a vertical adjustment of the plow-standards. Fixed to the lower ends of the plow-standards 29 are covering-shovels 32. Journaled in the rear ends of the arms 25 is a shaft 33, on which are fixed two hubs 34, said hubs being provided with radially-extending sockets 35, in which are arranged teeth 36, said teeth at their inner ends being provided with heads 37, which prevent the teeth from being entirely withdrawn from the said sockets by means of plugs 35ª, inserted in the ends of the sockets. Arranged in each of the sockets 35, between the heads 37 of the teeth and the hubs 34, are springs 38, which operate to project said teeth out of the sockets as far as the heads 37 will permit. The two hubs are so fixed on the shaft 33 that the teeth 36 of one hub will alternate with the teeth of the other hub. Fixed on the shaft 33 is a sprocket-wheel 39, and a sprocket-chain 40 passes about said sprocket-wheel and the sprocket-wheel 22 on the feed-roller shaft. Plow-handles 41 are attached at their lower ends to the opposite sides of the downwardly-extending rear ends of the plow-beams by the same bolt 24 that operates to hold the arms 25 in place.

The operation of my planter is as follows: The plow 7 operates to open a furrow, and the teeth 36 rotate in contact with the ground for rotating the shaft 33, and through the medium of the sprocket wheels and chain before described the feed-roll 19 is rotated, causing the seed-cups 20 therein to successively discharge the seed into a shoe beneath the hopper. As the seed are discharged they are dropped by a shoe 42, which is pendent from beneath the hopper, and said shoe operates to deliver the seed into the furrow which is opened by the plow 7. As before stated, the teeth 36 are movable in their sockets and held projected by the spring 38, and should either of said teeth strike an obstruction, such as a stone or root, the spring will yield and permit the teeth to be forced inward, thereby preventing the latter from being broken or injured. By arranging two hubs on the shaft in the manner described and causing the teeth to alternate the feed-driving mechanism is given a continuous motion instead of the jerky or intermittent motion which a single wheel having but a few teeth would impart. After the seed have been dropped in the furrow, the shovels 32 operate to throw the earth into the furrow and cover the seed.

Clamped about the beam is a clip 42ª, between the rear ends of which is rigidly attached a standard 43. To the standard 43 is attached a shovel 44, that operates to smooth out the furrow previously opened by the plow and prepare the earth for the reception of the seed. By making the plow vertically adjustable and traveling in the rear of the furrow-opener I prepare the furrow in advance of the seed-dropping device, so that the seed-dropper drops the seed at a uniform distance from the surface of the soil.

Having described my invention, what I claim is—

1. In a seed-planter, the combination with a seed-hopper and a rotary feed device arranged therein, of a shaft journaled in the rear end of the planter-frame and geared to the rotary feed device, a hub fixed on the shaft, teeth carried by the hub and radially movable therein, and means for forcing said teeth radially outward into contact with the ground to rotate the hub and feed device, substantially as described.

2. In a seed-planter, the combination with a seed-hopper and a rotary feed device arranged therein, of a shaft journaled in the lower end of the planter-frame and geared to the rotary feed device, a hub fixed on the shaft, teeth carried by the hub and radially movable therein, and springs arranged to force the said teeth radially outward and permit them to yield radially inward, substantially as described.

3. In a seed-planter, the combination with a seed-hopper and a rotary feed device arranged therein, of a shaft journaled in the rear end of the planter-frame and geared to the rotary feed device, a hub fixed on the shaft, radial sockets on the hub, teeth movably fitted in the sockets, coiled springs against which the inner ends of the teeth abut, said springs operating to yieldingly project the teeth radially from out the sockets, and means for preventing the teeth from being forced entirely from without the sockets, substantially as described.

4. In a seed-planter, the combination with a seed-hopper and a rotary feed device arranged therein, of a shaft journaled in the rear end of the planter-frame and geared to the rotary feed device, a hub fixed on the shaft, radial sockets on the hub, teeth movably fitted in the sockets, coiled springs against which the inner ends of the teeth abut, said springs operating to yieldingly project the teeth radially from out the sockets, said teeth being provided with heads at their inner ends for preventing them from being entirely forced out of the sockets, substantially as described.

5. In a seed-planter, the combination with a seed-hopper and a rotary feed device arranged therein, of a shaft journaled in the rear end of the planter-frame and geared to the rotary feed device, two hubs fixed on the shaft, teeth carried by the hubs and radially movable therein, means for yieldingly forcing said teeth radially outward into contact with the ground to rotate the hubs and feed device, the teeth of one of the hubs alternating with the teeth of the other hub, substantially as described.

6. In a seed-planter, the combination with a plow-beam curved downwardly at its rear end, a plow-foot attached to the lower end of the beam, a standard fixed to the beam and front end of the foot, a furrow-opening plow carried by the standard, a seeding device connected to the rear end of the beam, two rearwardly-extending and divergent arms fixed at their front ends to the beam, and covering-plows and mechanism for operating the seed device carried by said arms, substantially as described.

7. In a seed-planter, the combination with a plow-beam curved downwardly at its rear end, a plow-foot attached to the lower end of the beam, a standard comprising two parallel metallic straps fixed at their lower ends to the opposite sides of the plow-foot and at their upper ends clamped about the opposite sides of the plow-beam, a furrow-opening plow arranged upon the lower front edges of said straps, a clip arranged on the rear edges thereof, a bolt passing through the plow and clip, and between the straps, a seeding device connected to the rear end of the beam, two rearwardly-extending and divergent arms fixed at their front ends to the beam, and covering-plows and mechanism for operating the seed device carried by said arms, substantially as described.

8. In a seed-planter, the combination with a plow-beam curved downwardly at its rear end, a plow-standard, a furrow-opening plow carried by the standard, a seeding device connected to and disposed in the rear of the beam, two rearwardly-projecting and divergent arms, plow-standards carried by said arms, and means for connecting said standards to the arms and comprising metallic disks, one for each standard, each of said disks being centrally perforated and provided on each side with parallel shoulders, the shoulders on one side of the disk being arranged at an angle to the shoulders on the other side thereof, one set of the shoulders embracing the upper and lower edges of the said arms and the other set embracing the front and rear edges of the plow-standard, and bolts passing through the arms, disks and standards, substantially as described.

In testimony whereof I have hereunto set my hand in presence of two subscribing witnesses.

CARROL T. SYLVESTER.

Witnesses:
A. B. KIRKPATRICK,
JERRY KROMLER.